Nov. 27, 1928.  
E. L. RANKIN  
1,693,495  
DRIVING MECHANISM FOR GRAMOPHONES AND THE LIKE  
Filed May 29, 1926

INVENTOR  
Ernest L. Rankin  
BY  
ATTORNEY

Patented Nov. 27, 1928.

1,693,495

UNITED STATES PATENT OFFICE.

ERNEST LOUIS RANKIN, OF LONDON, ENGLAND, ASSIGNOR TO CHARLES WILLIAM WHITMORE HANBIDGE, OF LONDON, ENGLAND.

DRIVING MECHANISM FOR GRAMOPHONES AND THE LIKE.

Application filed May 29, 1926, Serial No. 112,650, and in Great Britain June 4, 1925.

This invention relates to improvements in driving mechanism for the record tables of gramophones and like apparatus and comprises an improved train of driving gear between a driving spring and a rotary spindle carrying the record table, and also an improved arrangement of the governing means for controlling the rate at which the table is rotated by the spring.

The improved mechanism comprises a spring in which energy is stored, a train of gearing between the spring motor and a longitudinally movable spindle on which the record table is mounted, and radial arms mounted on the spindle and carrying pivoted brake blocks which move into contact with a stationary surface when the speed of the table exceeds a predetermined speed.

In the accompanying drawing which illustrates one form of the invention,

Figure 1:
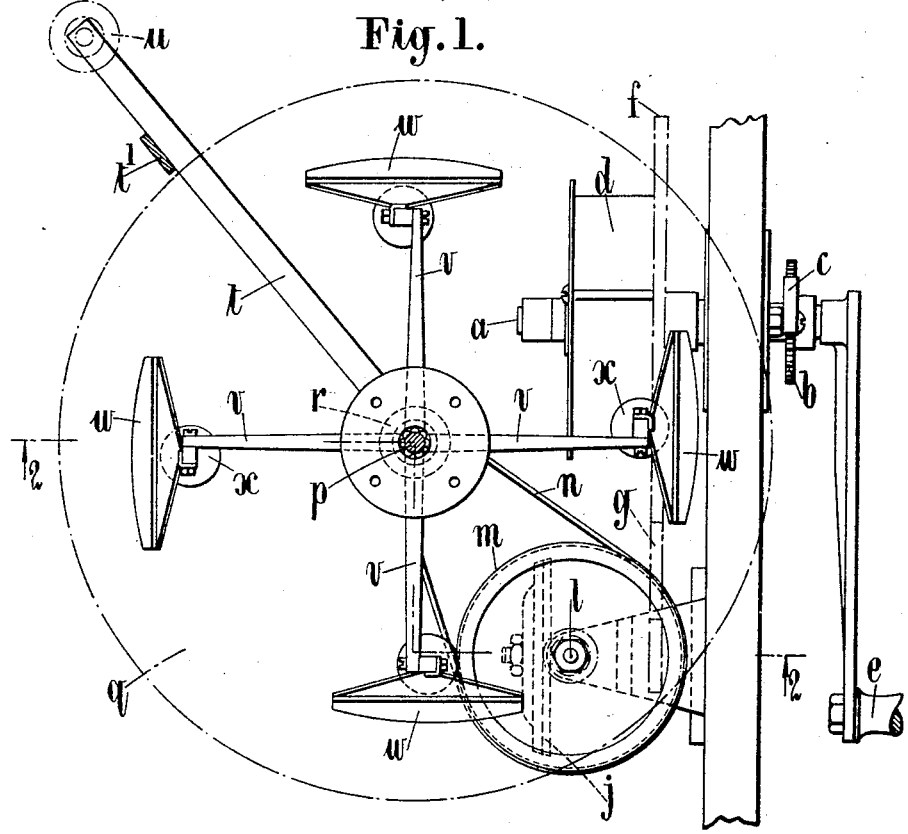
Figure 1 is a sectional plan view taken on the line 1—1 of Figure 2.
Figure 2:
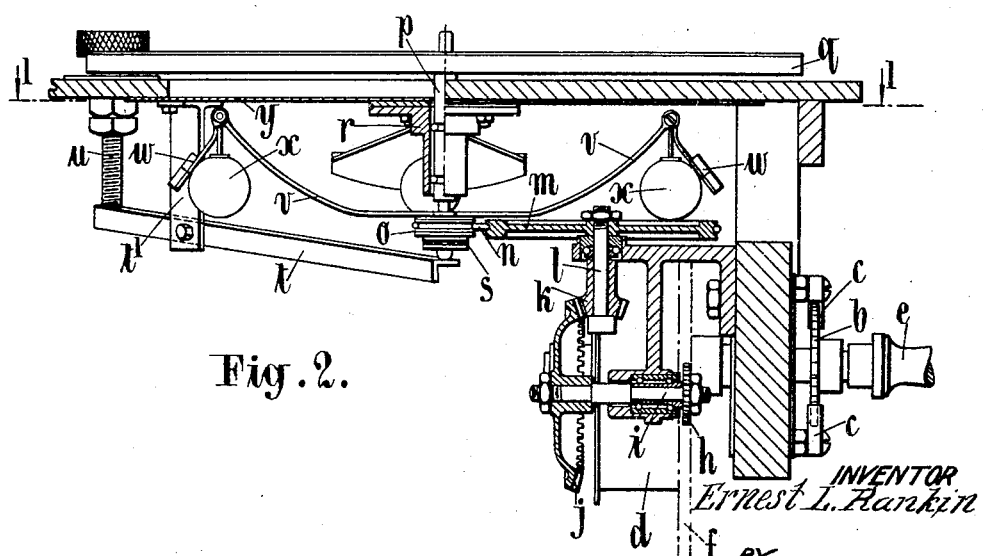
Figure 2 is a vertical section on the line 2—2 of Figure 1.

A driving spring spindle $a$ is rotatably mounted in suitable bearings carried by the casing of the gramophone. A ratchet $b$ mounted on the spring spindle $a$ is engaged by pawls $c$, the said ratchet and pawl device being provided to prevent rearward rotation of the spring spindle. The spring is mounted in a casing $d$ rotatable on the spring spindle $a$, one end of the spring being anchored to the casing $d$ and the other end to the spindle $a$. Then while the spring casing is suitably held against rotation, or allowed to rotate slowly, the spring spindle $a$ can be rotated, to wind up the spring, by means of a handle $e$. A sprocket wheel $f$ is mounted on the spring casing $d$ to drive, by means of a chain $g$, a sprocket pinion $h$ mounted on a spindle $i$. A gear wheel $j$ mounted on the spindle $i$ engages with a gear wheel $k$ mounted on a spindle $l$, and thus motion conveyed from the spring to the sprocket pinion $h$, is transmitted to a pulley $m$, keyed or otherwise mounted on the spindle $l$. The pulley $m$ is directly geared by a belt or pulley band $n$, which is preferably an elastic band, for example a coil spring, the ends of which are fastened together to form an endless belt, to a pulley $o$ mounted on the spindle $p$ of the record table $q$.

The record table spindle $p$ is mounted in a bearing $r$ provided on the gramophone casing, the spindle preferably having grooves therein to receive balls or rollers forming an anti-friction support within the bearing for the spindle which is movable in an axial or vertical direction. The lower end of the spindle is supported by a ball race $s$, the lower member of which is carried on the end of a lever $t$ pivotally supported on a bracket $t'$, which can be adjusted in position by means of a screw adjustment device $u$ so as to determine the position in which the spindle $p$ is supported. The spindle $p$ carries arms $v$ projecting radially therefrom and having at their ends pivoted brake blocks $w$ with counterweights $x$ arranged to be swung outwardly by centrifugal force to bring the brake-blocks into contact with a plate $y$ arranged upon the under surface of the top of the gramophone casing.

By raising or lowering the record table spindle $p$, the pivotal supports of the brake blocks can be adjusted towards or away from the plate $y$ so as to control the speed at which the spindle rotates.

It is preferable in connection with a device as hereinabove described, to provide an independent brake to act upon the record table or the spindle on which the table is mounted, in order to hold the table stationary if this is desired.

I claim:

1. A spring motor mechanism for gramophones comprising a driving spring, a spindle driven by the said spring through sprocket gearing, a second spindle driven by the first mentioned spindle through bevel gearing, a longitudinally adjustable record table spindle rotated by the said second spindle and an elastic belt gearing for transmitting motion from said second spindle to the record table spindle.

2. A spring motor mechanism for gramophones comprising a driving spring, a longitudinally adjustable spindle driven by the said spring through sprocket gearing, a second spindle driven by the first mentioned spindle through bevel gearing, a record table spindle, belt pulleys respectively mounted on the said second spindle and table spindle, and a helical spring joined at its ends to form an endless elastic driving belt connecting the said pulleys.

3. A spring motor mechanism for gramophones comprising a driving spring, sprocket gearing actuated by said spring to rotate a spindle, bevel gearing operatively connecting the said spindle to a second spindle, a longitudinally adjustable spindle carrying the record table, and a helical spring joined at its ends to form an endless belt gearing connecting the second spindle to the table spindle.

4. A spring motor mechanism for gramophones comprising a driving spring, sprocket gearing and bevel gearing transmitting motion from the said spring to a spindle carrying a belt pulley, a longitudinally adjustable spindle carrying the record table, a belt pulley on the spindle last mentioned, a helical spring joined at its ends to form an endless elastic belt and passing around the belt pulleys, and means for moving the table spindle axially.

5. A spring motor mechanism for gramophones comprising a spring in which energy is stored, a spindle rotated by the said spring, a longitudinally adjustable spindle on which a record table is mounted, an elastic belt gearing for transmitting motion from the spindle rotated by said spring to the spindle on which the record table is mounted, and a centrifugal governing device mounted upon the last mentioned spindle and arranged to coact with a stationary brake surface.

6. A spring motor mechanism for gramophones comprising a spring in which energy can be stored, a longitudinally adjustable spindle carrying a record table, gearing including an elastic belt gear transmitting motion from said spring to said spindle, a centrifugal governing device mounted upon the said adjustable spindle and a stationary brake surface with which the said governing device coacts.

7. A spring motor mechanism for gramophones comprising an energy storing driving spring; a longitudinally adjustable spindle for supporting a record table; sprocket gearing, bevel gearing and elastic belt gearing transmitting motion from the spring to said record table supporting spindle; and a centrifugal governing device mounted upon the said spindle.

ERNEST LOUIS RANKIN.